Dec. 20, 1949   T. L. WEYBREW ET AL   2,492,022
CONTROL SYSTEM
Filed Aug. 2, 1945

WITNESSES:
E. A. M‘Closkey

INVENTORS
Thelbert L. Weybrew
and Robert M. Strong.
BY
S. M. Crawford
ATTORNEY

Patented Dec. 20, 1949

2,492,022

UNITED STATES PATENT OFFICE 2,492,022

CONTROL SYSTEM

Thelbert L. Weybrew and Robert M. Strong, Pittsburgh, Pa., assignors to Westinghouse Electric Corporation, East Pittsburgh, Pa., a corporation of Pennsylvania Application August 2, 1945, Serial No. 608,582

7 Claims. (Cl. 318—142)

Our invention relates, generally, to control systems and, more particularly, to systems for controlling the operation of Diesel-electric locomotives and the like.

On Diesel-electric locomotives having two or more power plants, it is frequently desirable to connect the generators in parallel in order to reduce wheel slippage. The purpose of the parallel connection of the generators is to limit the rise in voltage and stabilize the system when the wheels driven by one or more motors slip on the rails. The generators are driven by separate engines and may be controlled by the well-known differential exciter system, or they may operate as shunt generators. In either case, the generator voltage decreases with increasing load currents so that the load placed on the two generators in parallel is evenly divided when the engine speeds are equal.

However, it has been found that because of inequalities in the speed of the engines, in the power output of the engines, or in the excitation of the generators, the common load is not always equally divided. This condition overloads one generator and has resulted in the failure of several machines. Overload protection of the usual type, such as fuses or overcurrent relays, cannot be utilized to protect the generators under the aforesaid condition because momentary overloading is necessary in order to start trains from standstill.

Accordingly, an object of our invention is to preclude the injurious effect of unequal division of loads between parallel-connected generators.

Another object of our invention is to control the division of load between parallel-connected generators.

A further object of our invention is to permit an unbalance in the current through parallel-connected motors but prevent an unbalance in the current of the parallel-connected generators which supply the motors.

Other objects of our invention will be explained fully hereinafter or will be apparent to those skilled in the art.

In accordance with our invention, the operation of a switch which connects the generators in parallel is so controlled by a relay responsive to an unbalance in the generator currents that the paralleling switch is opened under predetermined conditions of current flow.

Figure 1:
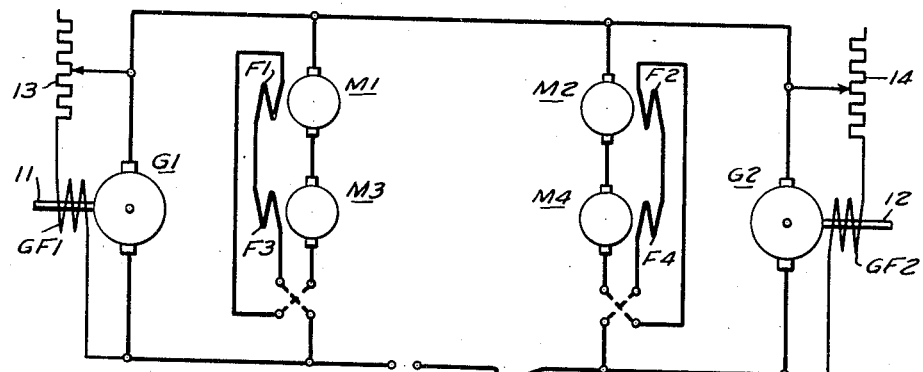
Figure 2:
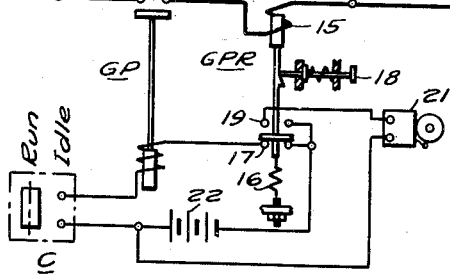
Figure 2:
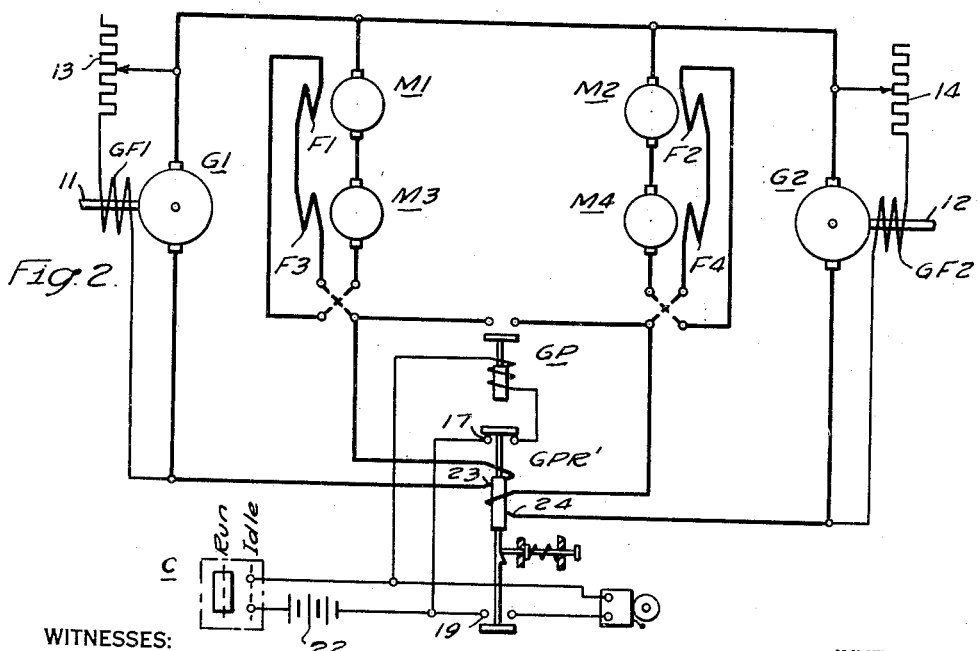

For a fuller understanding of the nature and objects of our invention, reference may be had to the following detailed description, taken in conjunction with the accompanying drawing, in which:

Figure 1 is a diagrammatic view of a control system embodying the principal features of our invention, and Fig. 2 is a diagrammatic view of a modification of the invention.

Referring to the drawing, and particularly to Fig. 1, the system shown therein comprises a pair of generators G1 and G2, which are of a type suitable for supplying current to traction motors M1, M2, M3 and M4 for propelling a vehicle (not shown). The generator G1 may be driven by an internal combustion engine (not shown) through a shaft 11. Likewise, the generator G2 may be driven by an engine through a shaft 12.

As shown, the generators G1 and G2 are provided with shunt field windings GF1 and GF2, respectively. Variable resistors 13 and 14 are provided for controlling the excitation current of the generators G1 and G2, respectively. As explained hereinbefore, the generators may be provided with differential exciters if desired. The motors M1, M2, M3 and M4 are of the series type and are provided with series field windings F1, F2, F3 and F4, respectively.

As explained hereinbefore, it is frequently desirable to connect the generators and traction motors in parallel-circuit relation in order to limit the rise in voltage and to stabilize the system when the wheels driven by one or two motors slip on the rails. When the generators are not paralleled and one motor spins its drivers when starting a heavy train, the back electromotive force of that motor decreases its armature current and that of the motor connected in series-circuit relation with it. The result is a decrease in the tractive effect. Furthermore, the generator voltage rises with a decrease in load current and tends to increase the spinning of the wheels.

When the generators are connected in parallel, the spinning of a motor normally supplied with current by one generator causes the generator to supply current to the two motors on the second power plant, thereby increasing their tractive effort. This increase in tractive effort helps to compensate for that lost due to the spinning motor. Also, since the generator voltage does not rise appreciably, the motor does not have a tendency to spin faster and faster. In fact, experience has shown that very often the motor will stop spinning without it being necessary to decrease the voltage applied to the spinning motor.

In order to permit the machines to be connected in parallel-circuit relation during normal operation, and at the same time provide for opening the parallel connection in the event that the load carried by the respective generators becomes so great that one of them may be dangerously overheated, a switch GP is provided for establishing the parallel connection between the machines. As explained hereinbefore, it has been found that because of inequalities in the speeds of the two engines, in the power output of the two engines, or in the excitation of the two generators, the common load is not always equally divided. This condition overloads one generator and may result in failure of the machine because of overheating.

Therefore, a relay GPR is provided for causing the opening of the switch GP in the event that the difference between the generator currents exceeds a predetermined amount. As shown in Fig. 1, the relay GPR is provided with a series coil 15, which is connected in the electrical circuit between the group of motors supplied by the generator G1 and the group of motors supplied by the generator G2.

The relay GPR is provided with a spring 16, the tension of which may be adjusted to vary the current required to open the circuit through its contact members 17. A spring-biased latch 18 is provided for retaining the relay in its uppermost position once it has been actuated to that position. The relay may also be provided with contact members 19, which are closed when the relay is in its uppermost position, thereby energizing a signal device 21 which may be a bell or light or other suitable signalling means.

The operation of the system is as follows. When a controller C is actuated to the "run" position, the actuating coil of the switch GP is energized from a battery 22 through the contact members 17 of the relay GPR. The switch GP closes and connects the machines in parallel-circuit relation. The engine speed lever (not shown) is then actuated to increase the speed of both engines. The generators build up voltage and supply current to the series traction motors.

So long as the speeds of the two engine-generator sets are the same, their voltages will be equal and the load divided equally between them. Under the foregoing conditions, each generator will supply its own motors and there will be no current flowing through the coil 15 of the relay GPR. However, if one engine does not receive sufficient fuel because of a closed fuel strainer, or for any other reason, its speed will be lower than the other. Therefore, its generator will develop a lower voltage. The other generator will then furnish a larger part of the load current. The degree of unbalance will depend on the difference in engine speeds. As an extreme condition, one engine may die and the other generator will then supply all the load current plus cranking current for the faulty engine-generator set.

Under the foregoing conditions, there will be current in the coil 15 of the relay GPR causing it to lift against the tension of its spring. The current through the actuating coil of the switch GP is interrupted by the opening of the contact members 17 of the relay, thereby causing the switch GP to open. The engine-generator set which is operating normally then supplies current to its own motors and overloading of this generator because of failure of the other engine is prevented.

The latch 18 prevents the relay GPR from reclosing until reset by the operator. The signalling device 21 will assist the operator in locating the cause of the faulty operation of the locomotive by indicating that there was a serious inequality in the output of the two generators.

As explained hereinbefore, the purpose of the parallel connection of the machines is to limit the rise in voltage and stabilize the system when wheel slippage occurs. The stabilizing effect results from a flow of current between the parallel-connected machines, which current must flow through the switch GP and the coil of the relay GPR.

However, tests show that usually the stabilizing current is relatively small and is less than the relay setting required from the standpoint of generator overload protection. As previously explained, the maximum difference between the currents furnished by the two generators is determined by the tension of the spring 16, which may be adjusted over a wide range to permit sufficient current to flow through the relay to produce the required stabilizing effect without the current causing a dangerous overload on either generator.

In the modification of the invention shown in Fig. 2, in which like parts are designated by the same reference characters as in Fig. 1, the apparatus and electrical connections are the same as those previously described with the exception that the relay GPR' is provided with two series coils 23 and 24. The coil 23 is connected in the circuit between the generator G1 and its motors M1 and M3. The coil 24 is connected in the circuit between the generator G2 and its motors M2 and M4. The two coils 23 and 24 are disposed on the relay frame in magnetic opposition. Therefore, the relay GR is responsive to an unbalance in the generator currents, but not to an unbalance in the motor currents.

It will be seen that the differential relay GPR' permits either generator to supply a stabilizing current to the motors for the other generator without operating the relay, so long as the currents supplied by the two generators are substantially equal. Thus, the stabilizing effect desired under wheel slippage conditions is obtained, and at the same time the generators are protected against overloads resulting from an unbalance in the generator currents caused by faulty engine operation or loss of excitation of a generator.

Since an unbalance in the motor currents resulting from wheel slippage conditions does not effect the operation of the relay GPR', the relay may be designed to operate at a relatively low differential current. Furthermore, it may be of a type which operates on a given current difference rather than a percentage difference, thereby making the relay more sensitive at higher currents when protection is most needed.

From the foregoing description, it is apparent that we have provided a control system which precludes the possibility of generator failures because of faulty engine performance. Furthermore, the system permits the electrical machines of a locomotive to be operated in parallel, thereby increasing the pulling ability of the locomotive by decreasing wheel slippage. The parallel connections may be utilized without danger to the generators. The apparatus required in the present system is simple in construction and may be readily installed in existing locomotives as well as in those being newly constructed.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a pair of generators, motors supplied with current by each generator, a switch for connecting the generators and motors in parallel-circuit relation, said switch being disposed to disconnect one generator and its motors from the other generator and its motors, relay means responsive to an unbalance in the generator currents for causing said switch to open when the difference in the generator currents exceeds a predetermined amount, and means for adjusting said relay means to vary the permissible difference in the generator currents.

2. In a control system, in combination, a pair of generators, motors supplied with current by each generator, a switch for connecting the generators and motors in parallel-circuit relation, said switch being disposed to disconnect one generator and its motors from the other generator and its motors, and a relay having differential coils thereon responsive to the generator currents for causing said switch to open when the difference in the generator currents exceeds a predetermined amount.

3. In a control system, in combination, a plurality of traction motors, a plurality of generators for supplying current to said motors, a switch for connecting the generators and motors in parallel-circuit relation, said switch being disposed to disconnect part of said motors and their generator from the other motors and their generator, and relay means responsive to an unbalance in the generator currents for causing said switch to open.

4. In a control system, in combination, a plurality of traction motors, a plurality of generators for supplying current to said motors, a switch for connecting the generators and motors in parallel-circuit relation, said switch being disposed to disconnect part of said motors and their generator from the other motors and their generator, and relay means responsive to an unbalance in the generator currents for causing said switch to open when the difference in the generator currents exceeds a predetermined amount.

5. In a control system, in combination, a plurality of traction motors, a plurality of generators for supplying current to said motors, a switch for connecting the generators and motors in parallel-circuit relation, said switch being disposed to disconnect part of said motors and their generator from the other motors and their generator, relay means responsive to an unbalance in the generator currents for causing said switch to open when the difference in the generator currents exceeds a predetermined amount, and means for adjusting said relay means to vary the permissible difference in the generator currents.

6. In a control system, in combination, a plurality of traction motors, a plurality of generators for supplying current to said motors, a switch for connecting the generators and motors in parallel-circuit relation, said switch being disposed to disconnect part of said motors and their generator from the other motors and their generator, and differential relay means responsive to an unbalance in the generator currents but not in the motor currents for causing said switch to open.

7. In a control system, in combination, a plurality of traction motors, a plurality of generators for supplying current to said motors, a switch for connecting the generators and motors in parallel-circuit relation, said switch being disposed to disconnect part of said motors and their generator from the other motors and their generator, and a relay having magnetically opposed coils thereon for causing said switch to open when the difference in the generator currents exceeds a predetermined amount.

THELBERT L. WEYBREW.
ROBERT M. STRONG.

REFERENCES CITED

The following references are of record in the file of this patent:

UNITED STATES PATENTS

| Number | Name | Date |
| --- | --- | --- |
| 771,347 | Wilson | Oct. 4, 1904 |
| 1,417,342 | Martin et al. | May 23, 1922 |
| 1,913,203 | Kennedy | June 6, 1933 |
| 2,053,218 | Frese | Sept. 1, 1936 |
| 2,215,341 | Weybrew | Sept. 17, 1940 |